United States Patent

Nishigaki et al.

(10) Patent No.: US 8,057,052 B2
(45) Date of Patent: Nov. 15, 2011

(54) LASER PROJECTOR

(75) Inventors: Hiroshi Nishigaki, Daito (JP); Atsuya Hirano, Daito (JP); Ken Nishioka, Daito (JP); Atsuhiko Chikaoka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 383 days.

(21) Appl. No.: 12/424,149

(22) Filed: Apr. 15, 2009

(65) Prior Publication Data

US 2009/0262314 A1 Oct. 22, 2009

(30) Foreign Application Priority Data

Apr. 16, 2008 (JP) ................. 2008-106333

(51) Int. Cl.
 *G03B 21/22* (2006.01)
 *H01S 3/13* (2006.01)

(52) U.S. Cl. ...................................... 353/85; 372/29.01

(58) Field of Classification Search ............. 250/559.13; 353/50, 86, 98; 372/9, 24, 29.01, 29.015, 372/38.02; 359/27, 234, 298, 199.3, 200.7, 359/227

See application file for complete search history.

(56) References Cited

U.S. PATENT DOCUMENTS

| | | | |
|---|---|---|---|
| 2001/0032884 A1* | 10/2001 | Ring et al. .................. | 235/454 |
| 2003/0042801 A1 | 3/2003 | Miyajima et al. | |
| 2005/0264501 A1 | 12/2005 | Choi et al. | |
| 2007/0222953 A1 | 9/2007 | Bock et al. | |

FOREIGN PATENT DOCUMENTS

| | | | |
|---|---|---|---|
| JP | 2004-333698 A | | 11/2004 |
| JP | 2004333698 A | * | 11/2004 |

OTHER PUBLICATIONS

Extended European Search Report dated Sep. 14, 2009 (Four (4) pages).

* cited by examiner

*Primary Examiner* — Georgia Epps
*Assistant Examiner* — Renee Naphas
(74) *Attorney, Agent, or Firm* — Crowell & Moring LLP

(57) ABSTRACT

Disclosed in a laser projector to display an image by projecting a laser beam from a laser light source to a projection screen including an electromagnetic driven scan mirror to scan the laser beam from the laser light source, a detection unit to detect a back EMF which is generated by a drive of the electromagnetic driven scan mirror at a time of start-up of the laser projector, a first determination unit to determine whether a value of the back EMF which is detected by the detection unit exceeded a predetermined threshold or not and a light source control unit to start a lighting of the laser light source when the value of the back EMF is determined as exceeding the predetermined threshold by the determination unit.

10 Claims, 10 Drawing Sheets

DRIVE ELECTRICITY

BACK EMF

DRIVE ELECTRICITY + BACK EMF

AMPLIFIED BACK EMF

LASER PROJECTOR

BACKGROUND OF THE INVENTION

1. Field of the Invention

The present invention relates to a laser projector to display an image by scanning light from a laser light source to a projection screen.

2. Description of Related Art

As a laser projector using laser as a light source, there is known a laser projector which displays an image by scanning laser beam from a laser light source on a screen by an electromagnetic driven scan mirror which is made to vibrate back and forth.

The scan mirror has its innate resonance frequency which is determined by the size and the density and hardness of the material, and by driving the scan mirror at the resonance frequency, the scan mirror is made to vibrate in maximum deflection angle and a large image can be displayed at low power.

FIG. 10A shows a relation between deflection angle of a scan mirror and frequency and FIG. 10B shows a relation between deflection angle of a scan mirror and frequency under different environments. As shown in FIG. 10A, for example, there is a need to drive the scan mirror at a frequency within a range of fd2 to fd1 in order to drive the scan mirror in a deflection angle θa or above. However, individual variation in the resonance frequency of the scan mirror according to the product cannot be avoided and it is difficult to make the scan mirror vibrate in a sufficient deflection angle by driving the scan mirror at the optimum frequency from the beginning at the time of start-up of the laser projector. Particularly, the inclination is steep near the resonance point in the waveform of the frequency and the deflection angle fluctuates greatly even when the frequency shifts slightly.

Moreover, as shown in FIG. 10B, the resonance frequency of each scan mirror is greatly influenced by surrounding temperature environment and the like. Therefore, according to an environment, the scan mirror does not always vibrate in a deflection angle θa or more even when the scan mirror is driven at a frequency within a range of fd2 to fd1. Therefore, driving of the scan mirror at the time of start-up is even more difficult.

When the laser light source is emitted in a state where the deflection angle of the scan mirror is not sufficiently assured at the time of start-up, the laser beam which is reflected by the scan mirror will be emitted so as to concentrate within a narrow range. Particularly, because there is a possibility that a person may be in front of the screen at the time of start-up of the projector, there is a possibility of damaging a human body by the laser beam which has a high energy density.

Thereby, for example, JP2004-333698 discloses a projector comprising a light scan detection unit to detect whether the galvanometer mirror is carrying out the scanning operation normally or whether the galvanometer mirror is not carrying out the scanning operation normally. In such projector, a method in which the generation of laser beam can be surely blocked to improve the safety by blocking the power supply to the laser light source when it is detected by the light scan detection unit that the galvanometer mirror is not carrying out the scanning operation normally is applied.

However, JP2004-333698 is a technique to block the generation of the laser beam to the laser light source every time when it is detected that the galvanometer mirror is not carrying out the operation normally while the projector is being used, and this does not solve the problem specific to the start-up of the above described laser projector. Namely, that problem is the possibility of having high energy density light, which is due to the emitted laser beam being concentrated within a narrow range at the time of start-up of the projector due to the scan mirror not vibrating in a sufficient deflection angle, impinging upon a human body.

SUMMARY OF THE INVENTION

It is, therefore, a main object of the present invention to surely improve the safety at the time of start-up in a laser projector.

According to a first aspect of the present invention, there is provided a laser projector to display an image by projecting a laser beam from a laser light source to a projection screen comprising an electromagnetic driven scan mirror to scan the laser beam from the laser light source, a detection unit to detect a back EMF which is generated by a drive of the electromagnetic driven scan mirror at a time of start-up of the laser projector, a first determination unit to determine whether a value of the back EMF which is detected by the detection unit exceeded a predetermined threshold or not and a light source control unit to start a lighting of the laser light source when the value of the back EMF is determined as exceeding the predetermined threshold by the determination unit.

According to a second aspect of the present invention, there is provided a laser projector to display an image by projecting a laser beam from a laser light source to a projection screen comprising an electromagnetic driven scan mirror to scan the laser beam from the laser light source, a detection unit to detect a phase difference between a back EMF which is generated by a drive of the electromagnetic driven scan mirror and a drive electricity at a time of start-up of the laser projector, a first determination unit to determine whether the phase difference detected by the detection unit is within a predetermined range or not and a light source control unit to start a lighting of the laser light source when the phase difference is determined as being within the predetermined range by the first determination unit.

According to a third aspect of the present invention, there is provided a laser projector to display an image by projecting a laser beam from a laser light source to a projection screen comprising an electromagnetic driven scan mirror to scan the laser beam from the laser light source, a detection unit to detect a back EMF which is generated by a drive of the electromagnetic driven scan mirror at a time of start-up of the laser projector, a first determination unit to determine whether a value of the back EMF which is detected by the detection unit exceeded a predetermined threshold or not, a changing unit to change a drive condition of the electromagnetic driven scan mirror or the predetermined threshold when the value of the back EMF is not determined as exceeding the predetermined threshold by the first determination unit during a predetermined time, a second determination unit to determine whether a number of times the value of the back EMF is determined as exceeding the predetermined threshold by the first determination unit is more or equal to a predetermined number of times or not and a light source control unit to start a lighting of the laser light source when the number of times the value of the back EMF is determined as exceeding the predetermined threshold by the first determination unit is determined so as to be more or equal to the predetermined number of times.

According to a fourth aspect of the present invention, there is provided a laser projector to display an image by projecting a laser beam from a laser light source to a projection screen comprising an electromagnetic driven scan mirror to scan the laser beam from the laser light source, a detection unit to detect a phase difference between a back EMF which is generated by a drive of the electromagnetic driven scan mirror and a drive electricity at a time of start-up of the laser projector, a first determination unit to determine whether the phase difference detected by the detection unit is within a predetermined range or not, a changing unit to change a drive condition of the electromagnetic driven scan mirror when the phase difference is not determined as being within the predetermined range by the first determination unit during a predetermined time, a second determination unit to determine whether a number of times the phase difference is determined as being within the predetermine range by the first determination unit is more or equal to a predetermined number of times or not and a light source control unit to start a lighting of the laser light source when the number of times the phase difference is determined as being within the predetermined range by the first determination unit is determined so as to be more or equal to the predetermined number of times.

BRIEF DESCRIPTION OF THE DRAWINGS

The above and other objects, advantages and features of the present invention will become more fully understood from the detail description given hereinbelow and the appended drawings which are given by way of illustration only, and thus are not intended as a definition of the limits of the present invention, and wherein.

DESCRIPTION OF THE PREFERRED EMBODIMENT

Hereinafter, embodiments of the present invention will be described with reference to the drawings.

First Embodiment

First, a laser projector of the first embodiment will be described.

Figure 1:
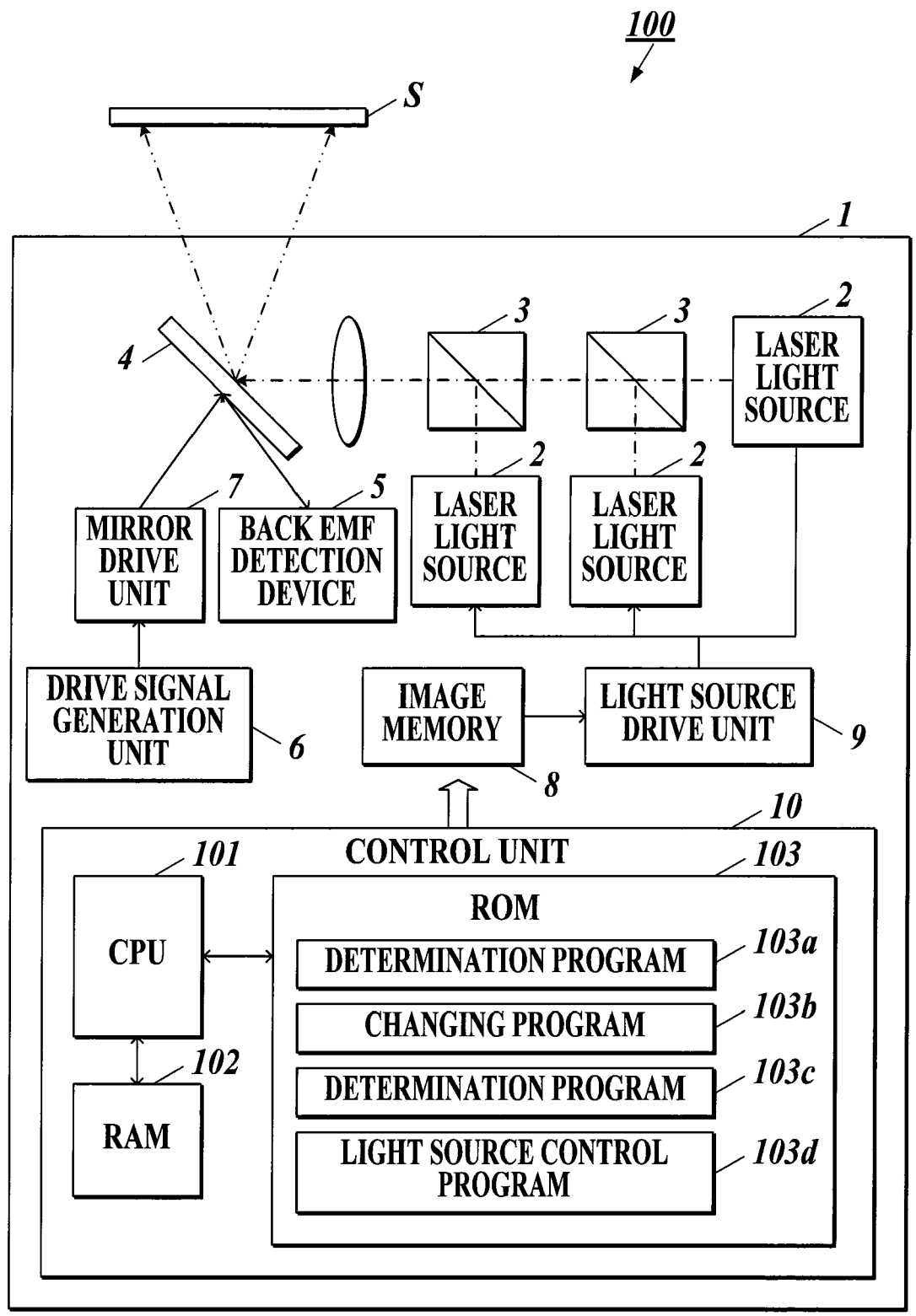
FIG. 1 is a block diagram showing a main structure of a laser projector of the first embodiment.
Figure 2:
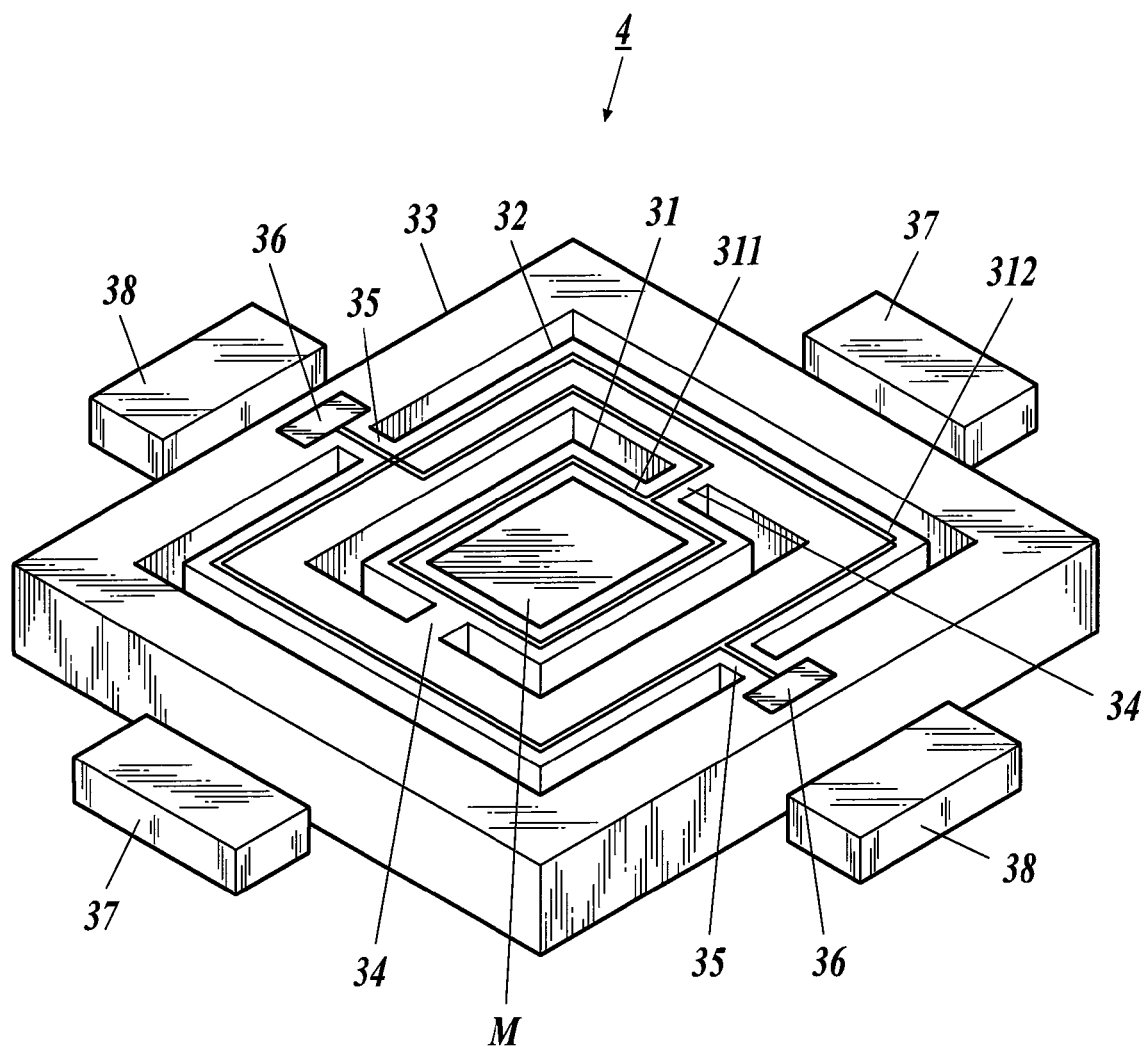
FIG. 2 is a schematic view showing a main structure of an electromagnetic driven scan mirror.
Figure 3:
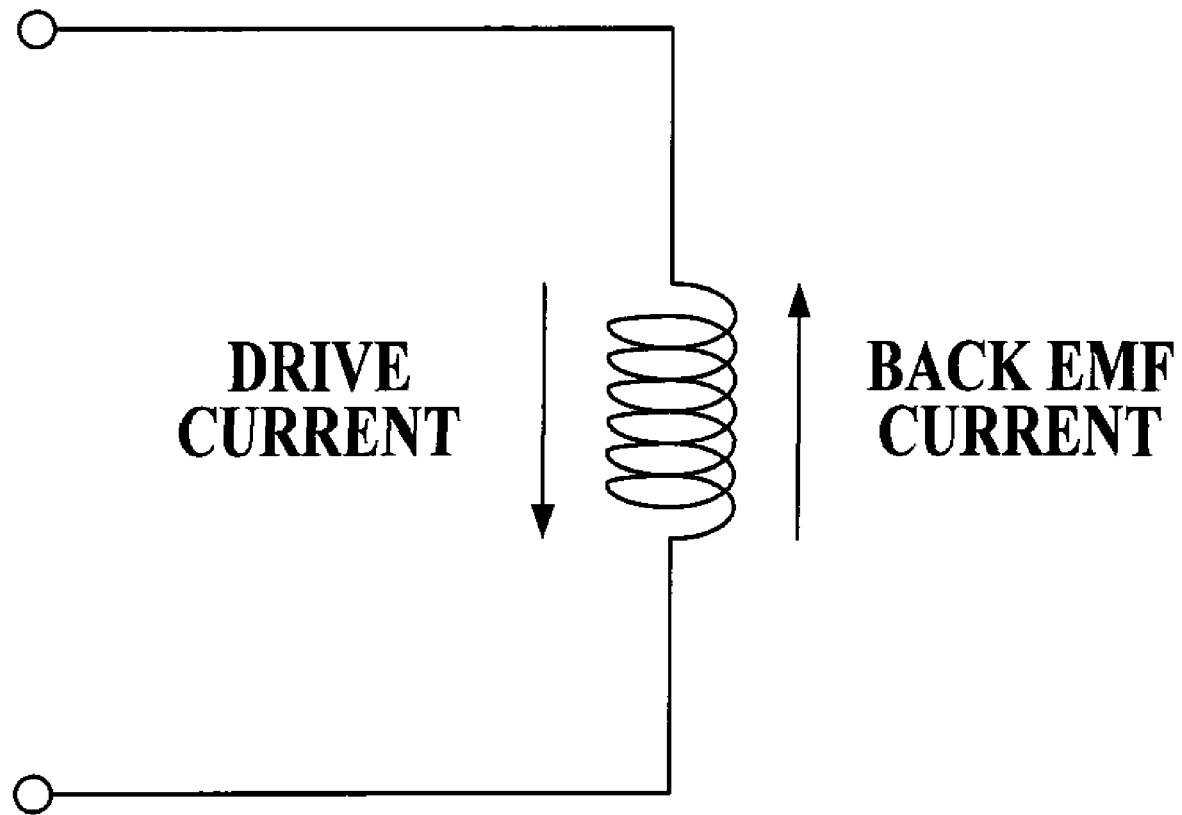
FIG. 3 shows a relation between a drive current and a back EMF current which flow within a coil of an electromagnetic driven scan mirror.
Figure 4:
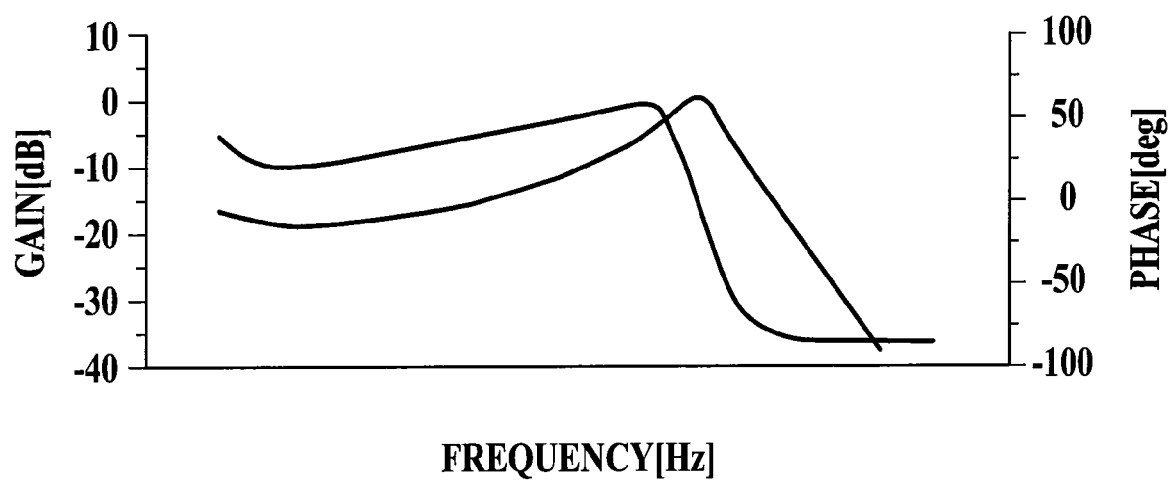
FIG. 4 shows amplitude of the electromagnetic driven scan mirror and frequency characteristic of phase.
Figure 5A:
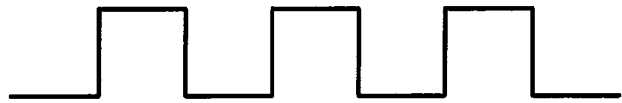
FIG. 5A shows a drive waveform when driven at a resonance frequency.
Figure 5B:
FIG. 5B shows a waveform of the back EMF.
Figure 5C:
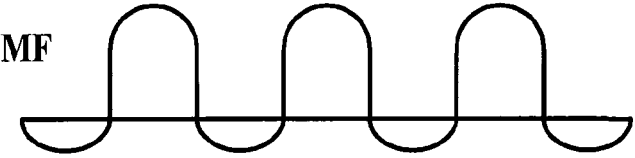
FIG. 5C shows the drive waveform in which the back EMF is added.
Figure 5D:
FIG. 5D shows a waveform of the back EMF which is separated from the drive waveform and which is amplified.
Figure 6:
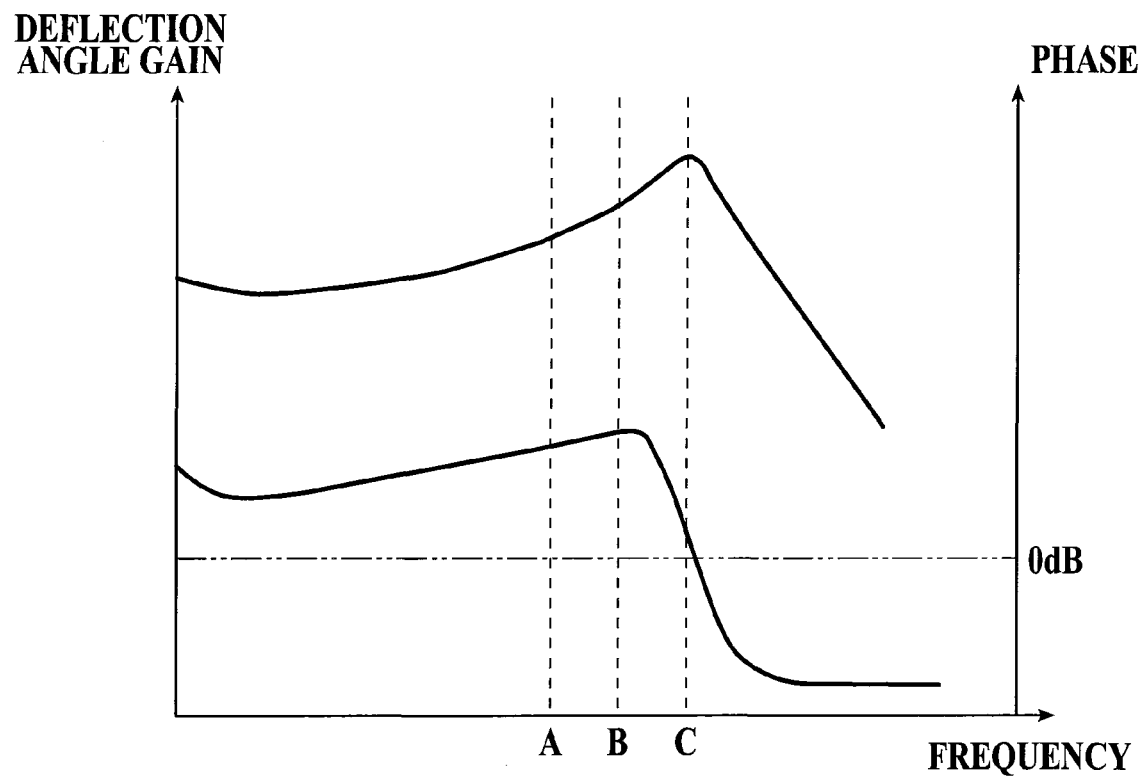
FIG. 6 is a diagram for explaining the start-process of lighting of the laser light sources which is to be executed at the time of start-up of the laser projector.
Figure 7:
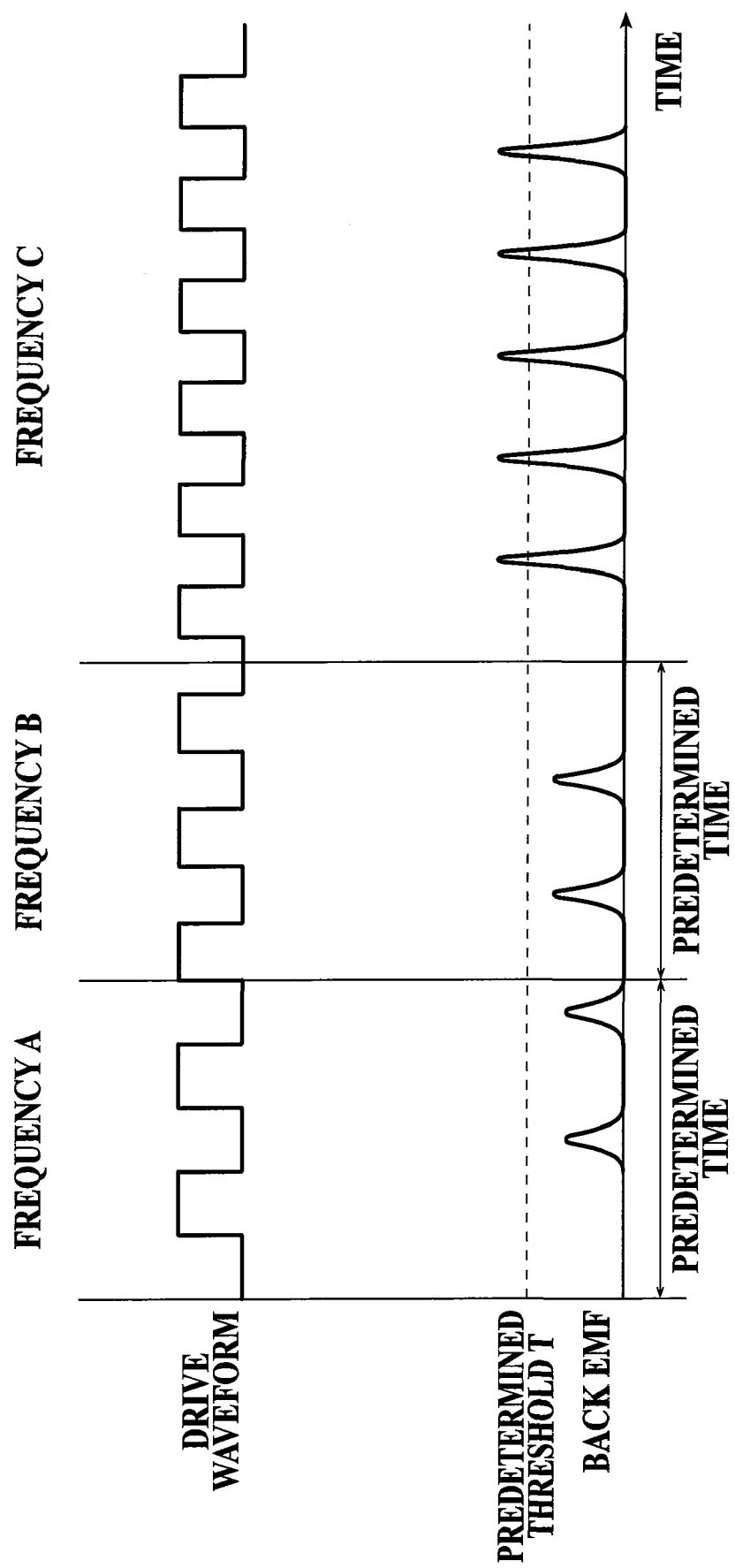
FIG. 7 is a diagram for explaining the start-process of lighting of the laser light sources which is to be executed at the time of start-up of the laser projector.
Figure 8:
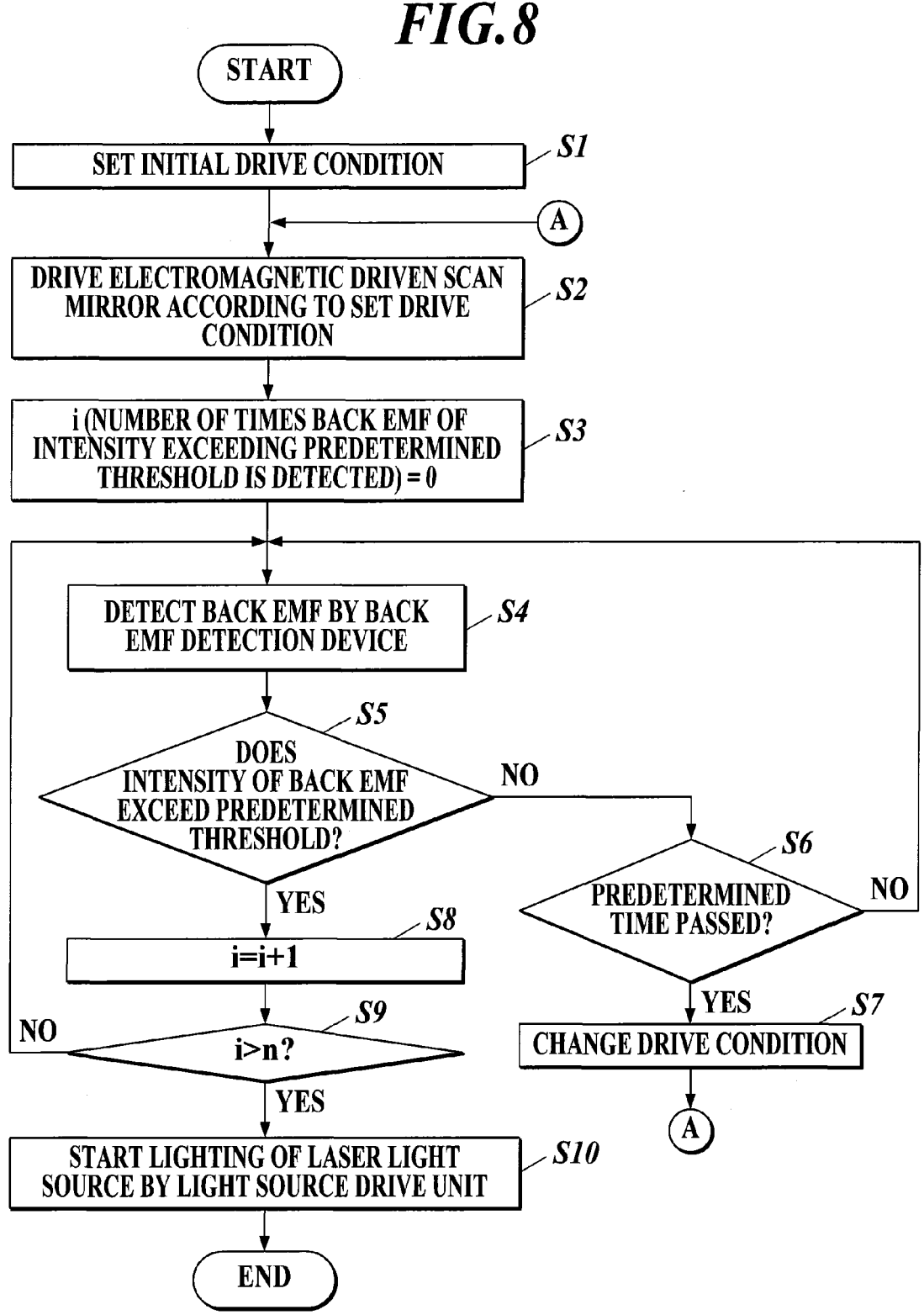
FIG. 8 is a flow chart showing the start-process of lighting of the laser light sources which is to be executed at the time of start-up of the laser projector according to the first embodiment.

FIG. 1 is a block diagram showing a main structure of the laser projector of the first embodiment. FIG. 2 is a schematic view showing a main structure of an electromagnetic driven scan mirror. FIG. 3 shows a relation between a drive current and a back EMF current which flow within a coil of the electromagnetic driven resonance mirror. FIG. 4 shows amplitude of the electromagnetic driven scan mirror and frequency characteristic of phase. FIG. 5A shows a drive waveform when driven at resonance frequency, FIG. 5B shows a waveform of the back EMF, FIG. 5C shows the drive waveform in which the back EMF is added and FIG. 5D shows a waveform of the back EMF which is separated from the drive waveform and which is amplified. FIGS. 6 and 7 are diagrams for explaining the start-process of lighting of the laser light source which is to be executed at the time of start-up of the laser projector. FIG. 8 is a flow chart showing the start-process of lighting of the laser light sources which is to be executed at the time of start-up of the laser projector according to the first embodiment. Here, the scope of the invention is not limited to examples shown in the drawings.

As shown in FIG. 1, the laser projector 100 of the first embodiment comprises laser light sources 2 which emit laser beams, mirror units 3 to multiplex the laser beams from the laser light sources 2, an electromagnetic driven scan mirror 4 to scan the laser beam emitted from the laser light sources 2 on a screen S, a back EMF detection device 5 as a detection unit to detect the back EMF which is generated in the electromagnetic driven scan mirror 4, a drive signal generation unit 6 to generate a drive signal of a predetermined frequency, a mirror drive unit 7 to drive the electromagnetic driven scan mirror 4 based on the drive signal generated in the drive signal generation unit 6, an image memory 8 to store an image data of an image to be scanned on the screen S, a light source drive unit 9 to drive the laser light sources 2 based on the image data, a control unit 10 and the like in a case 1.

For example, the laser light sources 2 are semiconductor lasers (LD: Laser Diode), and the laser light sources demodulate an image data from the image memory 8 and emit laser beams of red (R), green (G) and blue (B), respectively, by the drive of the light source drive unit 9.

For example, the mirror units 3 are dichroic mirrors or the like which allow the light of a predetermined wavelength to transmit and which reflect the light having wavelength other than the predetermined wavelength, and the mirror units 3 multiplex the laser beams of each color from the plurality of laser light sources 2 to output a laser beam having light axis of single axis to the electromagnetic driven scan mirror 4.

The electromagnetic driven scan mirror 4 reflects the laser beam from the laser light sources 2 in two-dimensional direction to project an image on the screen S by the electromagnetic drive. In the first embodiment, for example, the electromagnetic driven MEMS mirror using a technique of the MEMS (Micro Electro Mechanical Systems) is applied as the electromagnetic driven scan mirror 4. The MEMS mirror is a micro device which is manufactured by accumulating mechanical mechanism and electric circuit on a silicon wafer by using the micro machining technology, and the entire apparatus can be made smaller by using the MEMS mirror.

The back EMF detection device 5 detects the back EMF which is generated in the electromagnetic driven scan mirror 4 and outputs the detection signal according to the intensity of the detected back EMF to the control unit 10 at the time of start-up of the laser projector 100. The detection method of the back EMF will be described later.

The drive signal generation unit 6 generates the drive signal of the resonance frequency innate to the electromagnetic driven scan mirror 4 according to the control by the control unit 10.

The mirror drive unit 7 is connected to electrodes 36 (aftermentioned) of the electromagnetic driven scan mirror 4 to drive the electromagnetic driven scan mirror 4 by the drive signal generated in the drive signal generation unit 6.

As shown in FIG. 2, the MEMS mirror as the electromagnetic driven scan mirror 4 comprises a mirror substrate 31 to reflect the laser beam, an inner frame 32 formed so as to enclose the mirror substrate 31, an outer frame 33 formed so as to enclose the inner frame 32. The mirror substrate 31 is supported at inner side of the inner frame 32 by inner hinges 34 and can swing about the axis of the inner hinges 34. Further, the inner frame 32 is supported at inner side of the outer frame 33 by outer hinges 35 in a direction orthogonal to the inner hinges 34 and can swing about the axis of the outer hinges 35.

A mirror M is provided at approximately center of the surface of the mirror substrate 31, and a plan coil 311 is formed at the periphery of the mirror M so as to enclose the mirror M. Further, a plan coil 312 is formed at the periphery of the surface of the inner frame 32, and both ends of each of the coils 311, 312 are electrically connected to the electrodes 36. Moreover, a pair of permanent magnets 37 and a pair of permanent magnets 38 are disposed at sides of the outer frame 33 so that the north pole of the magnet and the south pole of the magnet face each other in each pair.

When an electric current is applied by applying drive voltage to the electrodes 36 at both ends of the coils 311, 312 in the above electromagnetic driven scan mirror 4, the Lorentz force is generated by the interaction with the magnetic field which is generated by the permanent magnets 37, 38 and the mirror substrate 31 and the inner frame 32 inclines, the inner hinges 34 or the outer hinges 35 acting as an axis. Therefore, by controlling the electric current to be applied to the electromagnetic driven scan mirror 4, the electromagnetic driven scan mirror 4 can swing freely in two directions orthogonal to each other (horizontal direction and vertical direction), the inner hinges 34 or the outer hinges 35 acting as the axis.

When the drive signal which fluctuates in a predetermined cycle is applied to the electromagnetic driven scan mirror 4, the electromagnetic driven scan mirror 4 vibrates in the predetermined cycle according to the cycle (frequency) of the drive signal. Particularly, when the electromagnetic driven scan mirror 4 is being driven at a resonance frequency $f_0$, the electromagnetic driven scan mirror 4 swings in a deflection angle which is the maximum of the current value. Therefore, a large image can be displayed most efficiently at low power.

Moreover, as shown in FIG. 3, the back EMF (self-induced EMF) in a direction opposite to the flow of the drive current is generated by self-induction with the drive of the electromagnetic driven scan mirror 4. Magnitude of the back EMF is proportionate to the rate of change of the drive current and is a value according to the frequency of the drive current. The back EMF is detected by the back EMF detection device 5 which is connected to the electrodes 36 at both ends of the coils 311, 312 in a form where the back EMF is added to the drive electricity.

Here, as shown in FIG. 4, the phase of the electromagnetic driven scan mirror 4 with respect to the drive electricity is 0 degrees when the electromagnetic driven scan mirror 4 is being driven at resonance frequency $f_0$ (at maximum gain). Phase of the mirror corresponds to phase of the back EMF, therefore, the phases of the back EMF and the drive waveform match one another when the electromagnetic driven scan mirror 4 is being driven at the resonance frequency $f_0$, and the peak of the positive electric potential of the back EMF is to correspond to the 90-degree position in the drive waveform and the peak of the negative electric potential of the back EMF is to correspond to the 270-degrees position in the drive waveform as shown in FIGS. 5A to 5D. As shown in FIG. 5C, the back EMF is detected in a form where the back EMF is added to the drive electricity, therefore, it is difficult to separate the positive peak value of the back EMF at the 90-degree position from the drive waveform to detect the back EMF. However, the negative peak value of the back EMF can be detected by observing the electric potential below or equal to the GND level at the 270-degree position. Therefore, the back EMF detection device 5 detects the back EMF by amplifying the back EMF of negative electric potential to positive electric potential by using an inverting amplifier or the like which applies an operational amplifier, for example, at the 270-degree position of the drive electricity.

At this time, when the electromagnetic driven scan mirror 4 is being driven at the innate resonance frequency $f_0$, the back EMF which exceeds a predetermined threshold T is to be detected by the back EMF detection device 5. In contrary, when the back EMF exceeding the predetermined threshold T is not to be detected, the phase and the waveform of the electromagnetic driven scan mirror 4 do not match one another and it is determined that the electromagnetic driven scan mirror 4 is not being driven at the resonance frequency $f_0$.

The laser projector 100 of the embodiment applies the above process and confirms whether the electromagnetic driven scan mirror 4 is being driven at the resonance frequency $f_0$ or not, that is, whether the electromagnetic driven scan mirror 4 is vibrating at the maximum deflection angle or not by determining whether the back EMF which is generated according to the drive frequency has reached the predetermined threshold T, which is to be detected when the electromagnetic driven scan mirror 4 is being driven in resonant drive, or not.

In particular, the frequency is raised gradually from the lowest drive frequency (or the highest frequency) among a plurality of drive frequencies which are provided in advance to drive the electromagnetic driven scan mirror 4, and the emission of the laser beam is to be started by determining that the deflection angle of the electromagnetic driven scan mirror 4 is sufficiently assured when the back EMF which exceeds a certain threshold T is detected.

Here, the back EMF detection device 5 can be structured so as to only detect the back EMF exceeding the set predetermined threshold T. Further, the back EMF detection device 5 may detect the peak value of the back EMF to determine whether the detected value of the back EMF exceeds the predetermined threshold T or not.

The image memory 8 stores image data of an image to be displayed on the screen S. Here, the supply source of image data is not limited to the image memory 8 and image data stored in various types of storage devices such as a PC (Personal Computer), a video camera or the like connected to the case 1 may be used.

The light source drive unit 9 drives the laser light sources 2 to adjust the laser beam for each pixel based on the image data read from the image memory 8.

For example, the control unit 10 comprises a CPU (Central Processing Unit) 101, a volatile memory such as a RAM (Random Access Memory) 102 used as a work area of the CPU 101 and a non-volatile memory such as a ROM (Read Only Memory) which stores various types of data, programs and the like.

The CPU 101 executes various types of programs stored in the ROM 103 according to the input signal inputted from each part of the laser projector 100 and integrally controls the overall operation of the laser projector 100 by outputting the output signal to each part based on the program according to the execution.

The ROM 103 stores a determination program (determination unit) 103*a*, a changing program (changing unit) 103*b*, a determination program (determination unit) 103*c*, a light source control program (light source control unit) 103*d* and the like in a program storage area.

The determination program 103*a* is a program to make the CPU 101 realize a function to determine whether the intensity of the back EMF detected by the back EMF detection device 5 exceeded a predetermined threshold T or not, for example.

In the execution of the determination program 103*a*, the CPU 101 selects a value of the back EMF which is to be detected when the electromagnetic driven scan mirror 4 is being driven in the resonance drive as the predetermined threshold T and determines whether the back EMF exceeding the threshold T is detected or not in the back EMF detection device 5.

The CPU 101 functions as the determination unit by executing the above determination program 103*a*.

The changing program 103*b* is a program to make the CPU 101 realize a function to change the drive condition of the electromagnetic driven scan mirror 4 or the predetermined threshold T when the value of the back EMF is not determined as exceeding the predetermined threshold T by the determination program 103*a* during a predetermined time, for example.

When it is not determined that the back EMF exceeding the predetermined threshold T is detected in the back EMF detection device 5 in the above described determination program 103*a*, the CPU 101 executes the changing program 103*b* to count the time while the back EMF exceeding the predetermined threshold T is not being detected and determines whether the time is longer or equal to a predetermined time or not. Then, when the time while the back EMF exceeding the predetermined threshold T is not being detected is longer or equal to the predetermined time, the drive frequency (drive condition) of the electromagnetic driven scan mirror 4 is changed by a predetermined value (for example, +/−1 Hz). Here, the drive frequency is one example of the drive condition, and the drive condition such as temperature which is a cause of resonance frequency fluctuation may be changed.

Moreover, when the back EMF exceeding the predetermined threshold T is not detected even when the drive frequency is changed, the CPU 101 detects the back EMF by lowering the predetermined threshold T. That is, when an unpredicted situation occurred and when the back EMF exceeding a certain threshold T is not detected by setting any of the plurality of drive frequencies which are provided in advance as candidates of resonance frequency as the threshold T, the CPU 101 once lowers the level of the threshold T to a level where the back EMF can be detected. Then, based on the back EMF which can be detected, the CPU 101 calculates the phase difference between the drive waveform and the back EMF to detect whether the drive frequency is positively shifted or negatively shifted with respect to the resonance frequency. Thereafter, the CPU 101 changes the drive frequency in a direction approaching the resonance frequency to carry out a drive of the electromagnetic driven scan mirror 4 again. In such way, the electromagnetic driven scan mirror 4 can be driven at resonance frequency efficiently in shorter time even when the resonance frequency of the electromagnetic driven scan mirror 4 is greatly fluctuated for some reason.

The CPU 101 functions as the changing unit by executing the above changing program 103*b*.

The determination program 103*c* is a program to make the CPU 101 realize a function to determine whether the number of times the value of the back EMF is determined as exceeding the predetermined threshold T by the determination program 103*a* is more or equal to a predetermined number of times or not, for example.

When it is determined that the intensity of the back EMF which is detected in the back EMF detection device 5 exceeds the predetermined threshold T by the execution of the determination program 103*a*, the CPU 101 counts the number of times the intensity of the back EMF exceeded the threshold T and determines whether the number of times the intensity of the back EMF exceeded the threshold T is more or equal to a predetermined number of times (for example, 5 times) or not in the execution of the determination program 103*c*.

The CPU 101 functions as the determination unit by executing the above determination program 103*c*.

The light source control program 103*d* is a program to make the CPU 101 realize a function to start lighting of the laser light sources 2 when it is determined that the number of times the back EMF is determined as exceeding the predetermined threshold T by the determination program 103*c* is more or equal to the predetermined number of times, for example.

When the CPU 101 determines that the number of times the intensity of the back EMF exceeded the predetermined threshold T is more or equal to the predetermined number of times by the execution of the above described determined program 103*c*, the CPU 101 executes the light source control program 103*d* to light the laser light sources 2 and start emitting the laser beam by the light source drive unit 9.

The CPU 101 functions as the light source control unit along with the light source drive unit 9 by executing the above light source control program 103*d*.

Next, the start-process of lighting of the laser light sources which is carried out by executing the determination program 103*a*, the changing program 103*b*, the determination program 103*c*, the light source control program 103*d* at the time of start-up of the laser projector 100 will be described more specifically with reference to FIGS. 6 and 7.

After the laser projector 100 is started-up, the mirror drive unit 7 supplies the drive signal which is generated in the drive signal generation unit 6 to the electrodes 36 connected to both ends of the electromagnetic driven scan mirror 4.

First, the mirror drive unit 7 drives the electromagnetic driven scan mirror 4 at frequency A (for example, the lowest frequency among the drive frequencies provided in advance) which is provided in advance as an initial setting, for example. As shown in FIG. 6, the back EMF exceeding the predetermined threshold T is not detected in the back EMF detection device 5 due to the occurrence of phase shifting of the mirror because the frequency A is far from the actual resonance frequency of the electromagnetic driven scan mirror 4.

When the value of the back EMF does not exceed the threshold T even when the predetermined time is passed, the drive condition is to be changed. For example, the frequency B in which a predetermined value (for example, +1 Hz) is added to the frequency A is set as a new drive condition.

Next, the mirror drive unit 7 drives the electromagnetic driven scan mirror 4 at the frequency B. Because the frequency B is also a value far from the resonance frequency similarly to the frequency A, the phase shifting of the mirror is not resolved. Therefore, the back EMF exceeding the threshold T is not detected in the back EMF detection device 5.

When the intensity of the back EMF does not exceed the threshold T even when the predetermined time is passed, the drive condition is to be changed again. For example, the frequency C in which a predetermined value (for example, +1 Hz) is added to the frequency B is set as a new drive condition.

Next, the mirror drive unit 7 drives the electromagnetic driven scan mirror 4 at the frequency C.

The frequency C is included within the resonance frequency or within a predetermined error range of the resonance frequency. Therefore, the phase lag of the mirror will be 0 and the back EMF exceeding the threshold T will be detected by the back EMF detection device 5. Further, when the number of times the back EMF exceeding the threshold T is detected exceeds the predetermined number of times (for example, 5 times), the frequency C is determined as the resonance frequency of the electromagnetic driven scan mirror 4 or is a frequency within a predetermined error range of the resonance frequency and is determined that the electromagnetic driven scan mirror 4 is vibrating in the maximum deflection angle.

When it is confirmed that the deflection angle of the electromagnetic driven scan mirror 4 is at a sufficient angle, thereafter, the light source drive unit 9 starts to drive the laser light sources 2. Therefore, a condition where the laser beam from the laser light source 2 is emitted so as to concentrate within a narrow range by the scan mirror in which the deflection angle is not sufficiently assured at the time of start-up of the laser projector 100 can be prevented and the safety for a human body at the time of start-up can be improved.

Next, flow of the start-process of lighting of the laser light sources which is executed at the time of start-up of the laser projector 100 according to the first embodiment will be described with reference to the flowchart of FIG. 8.

First, in step S1, the CPU 101 sets the drive condition (for example, frequency) which is stored in advance as an initial drive condition. In step S2, the CPU 101 drives the electromagnetic driven scan mirror 4 by the set drive condition. In step S3, i(number of times the back EMF in which the intensity exceeding the predetermined threshold T is detected) is set to 0.

Next, in step S4, the CPU 101 detects the back EMF which is generated at both ends of the coils 311, 312 by the back EMF detection device 5 which is connected to the electrodes 36 at both ends of the coils 311, 312 of the electromagnetic driven scan mirror. In step 5, the CPU 101 determines whether the intensity of the detected back EMF exceeds the predetermined threshold T corresponding to the drive condition or not. When the CPU 101 determines that the intensity of the detected back EMF exceeds the predetermined threshold T in step S5 (step S5; Yes), the process proceeds to step S8, and when the CPU 101 determines that the intensity of the detected back EMF does not exceed the predetermined threshold T (step S5; No), the process proceeds to step S6.

In step S6, the CPU 101 determines whether the predetermined time has passed since the electromagnetic driven scan mirror 4 is started to be driven according to the present drive condition and when the CPU 101 determines that the predetermined time has not passed since the electromagnetic driven scan mirror 4 is started to be driven according to the present drive condition (step S6; NO), the process returns to step S4 and the above process is repeated. On the other hand, when the CPU 101 determines that the predetermined time has passed in step S6 (step S6; Yes), the drive condition is changed in step S7 and the process returns to step S2.

The CPU 101 substitutes i+1 in place of i in step S8 and determines whether i (number of times the back EMF in which the intensity exceeding the predetermined threshold T is detected) >n(predetermined number of times) is true or not in step S9. When the CPU 101 determines that i>n is not true in step S9 (step S9; No), the process returns to step S4 and repeats the above process. On the other hand, when the CPU 101 determines that i>n is true in step S9 (step S9; Yes), the CPU 101 lights the laser light sources 2 and starts emission of the laser beam by the light source drive unit 9 and finishes the process.

According to the above described laser projector 100 of the first embodiment, the laser beam from the laser light sources 2 is scanned by the electromagnetic driven scan mirror 4, the back EMF generated by the drive of the electromagnetic driven scan mirror 4 is detected by the back EMF detection device (detection unit) 5 at the time of start-up of the laser projector 100, whether the intensity of the back EMF which is detected by the back EMF detection device (detection unit) 5 exceeded the predetermined threshold T or not is determined by the execution of the determination program (determination unit) 103a, and the lighting of the laser light sources 2 is started by the light source control program (light source control unit) 103d when the intensity of the back EMF is determined as exceeding the predetermined threshold T by the determination program (determination unit) 103a.

That is, at the time of start-up, the laser light sources 2 are not lit when the deflection angle of the electromagnetic driven scan mirror 4 is not yet sufficient, and the lighting of the laser light sources 2 is started only when it is confirmed that the deflection angel of the electromagnetic driven scan mirror 4 is sufficient. Therefore, the laser beam emitted from the laser light source 2 is prevented from being emitted within a narrow range by the scan mirror in which sufficient deflection angle is not assured, and a possibility of damaging a human body can be eliminated. Thus, safety at the time of start-up can be improved surely in the laser projector 100.

Moreover, whether the electromagnetic driven scan mirror 4 is being driven in a sufficient deflection angle or not is determined by whether the value of the back EMF generated by the drive of the electromagnetic driven scan mirror 4 exceeded the predetermined threshold T or not. Therefore, the safety at the time of start-up can be assured in a reliable and easy method.

Further, whether the number of times the intensity of the back EMF is determined so as to exceed the predetermined threshold T by the determination program (determination unit) 103a is more or equal to the predetermined number of times or not is determined by the determination program (determination unit) 103c, and the lighting of the laser light sources 2 is started by the light source control program (light source control unit) 103d when it is determined that the number of times the intensity of back EMF is determined as exceeding the predetermined threshold T by the determination program (determination unit) 103c is more or equal to the predetermined number of times.

Therefore, lighting of the laser light sources 2 is started only after it is fully confirmed that sufficient deflection angle of the electromagnetic driven scan mirror 4 is obtained, and the safety at the time of start-up is improved more.

Moreover, when it is not determined that the value of the back EMF exceeded the predetermined threshold T by the determination program (determination unit) 103a during the predetermined time, the drive condition of the electromagnetic driven scan mirror 4 or the predetermined threshold T is changed by the changing program (changing unit) 103b.

Therefore, each electromagnetic driven scan mirror 4 can be driven at their innate resonance frequency even when the resonance frequency is fluctuating. Further, an optimum drive condition (resonance frequency) of the electromagnetic driven scan mirror 4 can be figured out by gradually changing the drive frequency of the electromagnetic driven scan mirror 4. Thus, each electromagnetic driven scan mirror 4 can be driven at their innate resonance frequency in an easy method.

Moreover, because the predetermined threshold T can be changed, the drive frequency can be made to match the resonance frequency easily by lowering the threshold T to a level where in back EMF is detectable and calculating the phase difference between the drive waveform and the back EMF based on the back EMF which is now detectable by the threshold T to detect whether the drive frequency is positively shifted or negatively shifted with respect to the resonance frequency when the back EMF which exceeds the predetermined threshold T is not detected. Therefore, the electromagnetic driven scan mirror 4 can be driven at resonance frequency effectively in more shorter amount of time even when the resonance frequency of the electromagnetic driven scan mirror 4 greatly fluctuates, and lighting of the laser beam can be started by promptly assuring safety at the time of start-up.

Second Embodiment

Next, a laser projector according to the second embodiment will be described. Here, same symbols are used for the parts overlapping with the parts in the above described first embodiment and the descriptions are omitted.

Figure 9:
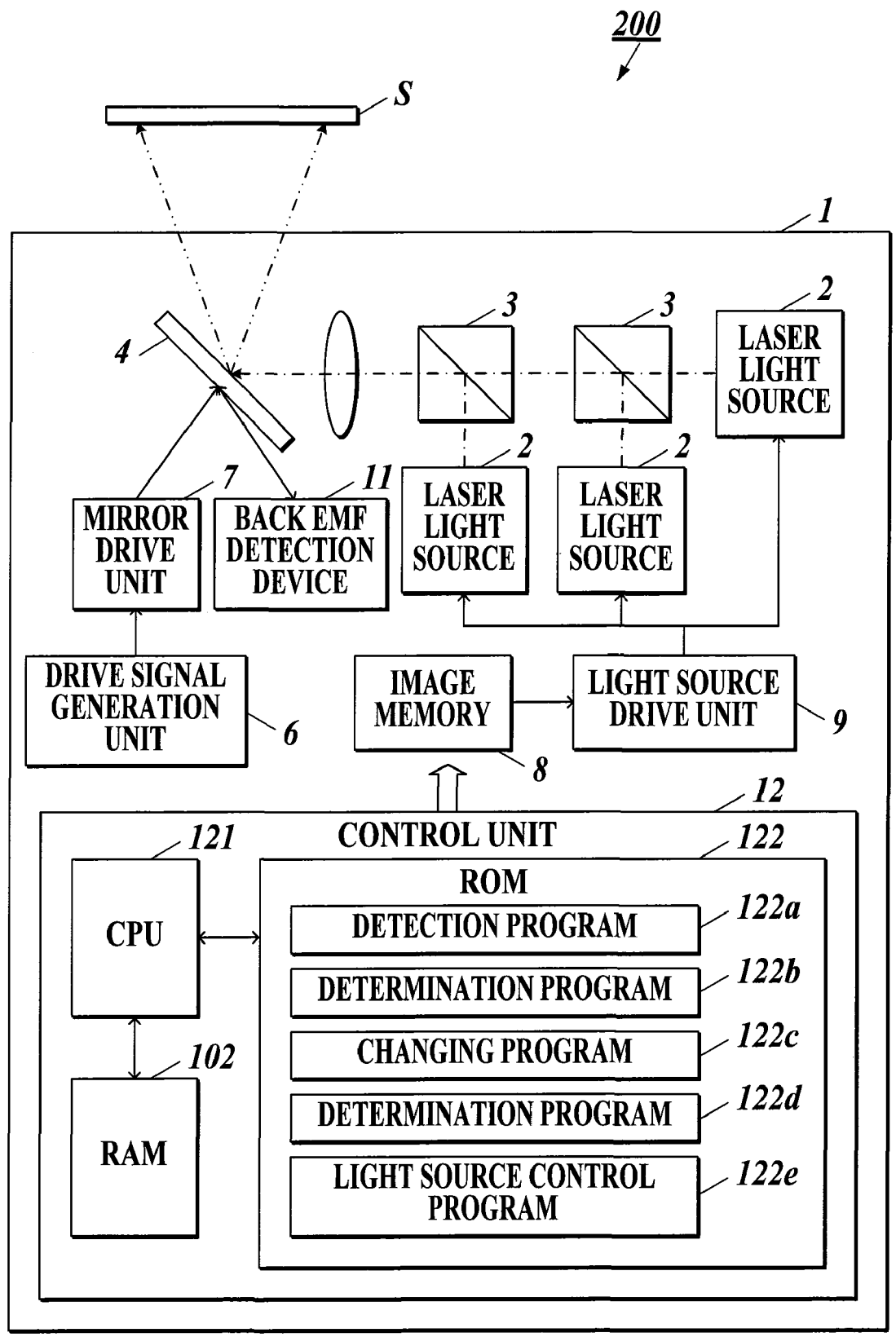
FIG. 9 is a block diagram showing a main structure of a laser projector according to the second embodiment.
Figure 10A:
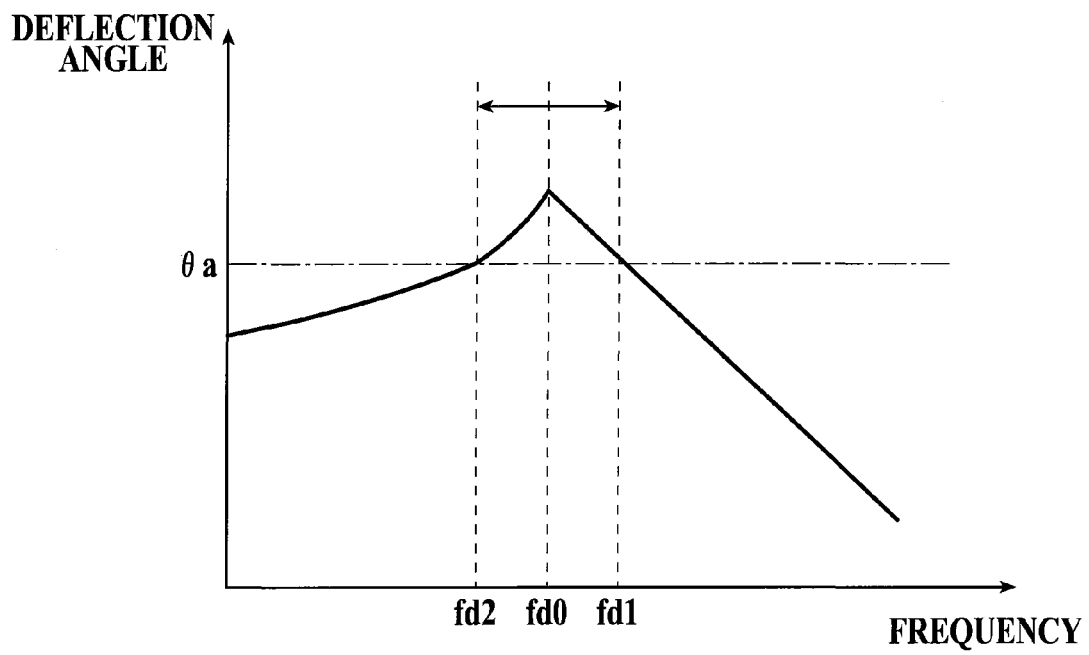
FIG. 10A shows a relation between deflection angle of the scan mirror and frequency.
Figure 10B:
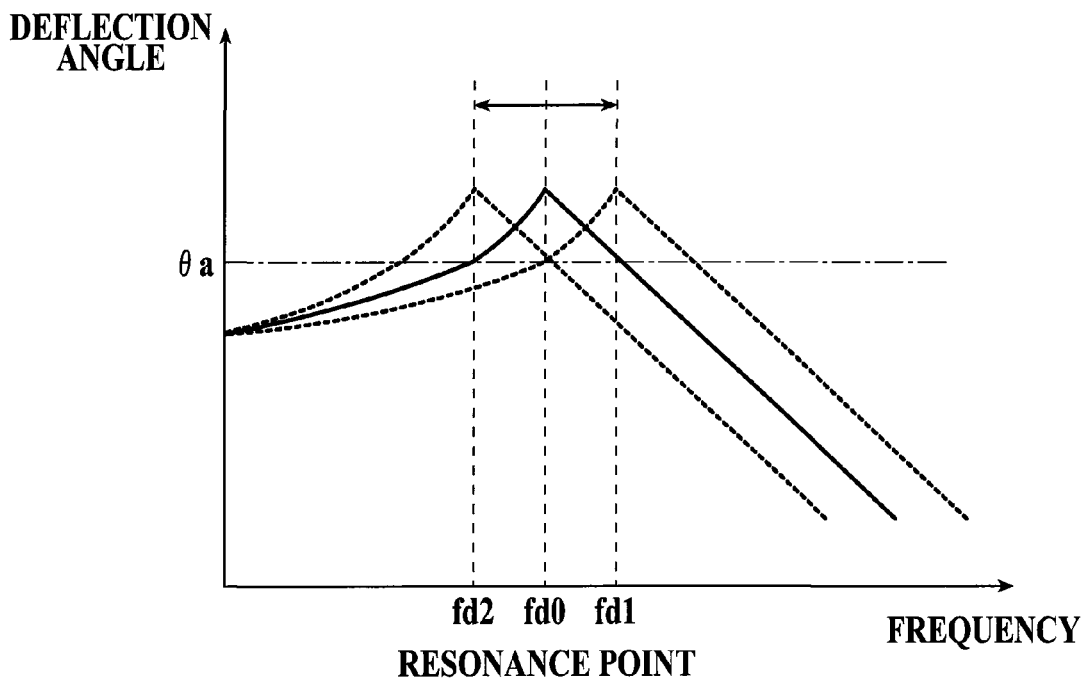
FIG. 10B shows a relation between deflection angle of the scan mirror and frequency under different environments.

FIG. 9 is a block diagram showing a main structure of a laser projector of the second embodiment.

As shown in FIG. 9, the laser projector 200 according to the second embodiment comprises the laser light sources 2 which emit laser beams, the mirror units 3 which multiplex the laser beams from the laser light sources 2, the electromagnetic driven scan mirror 4 which scans the laser beam emitted from the laser light sources 2 on the screen S, the back EMF detection device 11 as a detection unit to detect the back EMF which is generated in the electromagnetic driven scan mirror 4, the drive signal generation unit 6 to generate a drive signal of a predetermined frequency, the mirror drive unit 7 to drive the electromagnetic driven scan mirror 4 based on the drive signal generated in the drive signal generation unit 6, the image memory 8 to store image data of an image to be scanned on the screen S, the light source drive unit 9 to drive the laser light sources 2 based on the image data, the control unit 12 and the like in the case 1.

For example, the control unit 12 comprises the CPU (Central Processing Unit) 121, a volatile memory such as a RAM (Random Access Memory) 102 or the like to be used as a work area of the CPU 121 and a non-volatile memory such as a ROM (Read Only Memory) 122 or the like to store various types of data, programs and the like.

The CPU 121 executes various types of programs which are stored in the ROM 122 according to the input signal to be input from each part of the laser projector 200 and integrally controls the overall operation of the laser projector 200 by outputting the output signal to each part based on the programs according to the execution.

The ROM 122 stores the detection program (detection unit) 112*a*, the determination program (determination unit) 112*b*, the changing program (changing unit) 112*c*, the determination program (determination unit) 112*d*, the light source control program (light source control unit) 112*e* and the like in the program storage area.

For example, the detection program 112*a* is a program to make the CPU 121 realize a function to detect the phase difference between the back EMF which is generated by the drive of the electromagnetic driven scan mirror 4 and the drive electricity at the time of start-up of the laser projector 200.

Here, as described above in the first embodiment, when the electromagnetic driven scan mirror 4 is driven at its innate resonance frequency $f_0$ (at maximum gain), the phase of the electromagnetic driven scan mirror 4 with respect to the drive electricity will be 0 degrees as shown in FIG. 4. Therefore, when the electromagnetic driven scan mirror 4 is being driven at the innate resonance frequency $f_0$, phases of the back EMF and the drive waveform are to match and the negative peak of the back EMF is to be detected by the back EMF detection device 11 at the 270 degrees position of the drive electricity. In contrary, when the negative peak of the back EMF is detected at a position shifted from the 270 degrees position of the drive electricity, phase of the mirror (that is, phase of the back EMF) and the drive electricity do not match, and it can be determined that the electromagnetic driven scan mirror 4 is not being driven at the resonance frequency $f_0$. That is, in the laser projector 200 of the second embodiment, peak of the value of the back EMF which is generated according to the drive frequency is detected and the phase difference between the phase of the back EMF and the phase of the drive electricity is detected by the gap between the peak position of the value of the detected back EMF and the position of the drive waveform at the 270 degrees Then, whether the electromagnetic driven scan mirror 4 is being driven at the resonance frequency or not, that is, whether the electromagnetic driven scan mirror 4 is vibrating in maximum deflection angle or not is confirmed by determining whether the detected phase difference is within a predetermined range or not.

The CPU 121 functions as the detection unit along with the back EMF detection device 11 by executing the above detection program 112*a*.

The determination program 112*b* is a program to make the CPU 121 realize a function to determine whether the phase difference which is detected by the detection program 112*a* is within a predetermined range or not, for example.

In execution of the determination program 112*b*, the CPU 121 determined whether the phase difference between the drive electricity and the back EMF is within the predetermined range or not by the negative peak position of the back EMF which is detected by the back EMF detection device 11.

The CPU 121 functions as the determination unit by executing the above determination program 112*b*.

The changing program 112*c* is a program to make the CPU 121 realize a function to change the drive condition of the electromagnetic driven scan mirror 4 when it is not determined that the phase difference is within the predetermined range by the determination program 112*b* during the predetermined time, for example.

When it is not determined that the phase difference between the drive electricity and the back EMF which is detected by the back EMF detection device 11 is within the predetermined range by the above described determination program 112*b*, the CPU 121 executes the changing program 112*c* and counts the time while the phase difference does not fall within the predetermined range to determine whether the time is longer or equal to a predetermined time. When the time in which the phase difference between the drive electricity and the back EMF does not fall within the predetermined range is longer or equal to the predetermined time, the CPU 121 changes the drive frequency (drive condition) of the electromagnetic driven scan mirror 4 by a predetermined value (for example, ±1 Hz).

The CPU 121 functions as the changing unit by executing the above changing program 112c.

The determination program 112d is a program to make the CPU 121 realize a function to determine whether the number of times the phase difference is determined as being within the predetermined range by the determination program 112b is more or equal to a predetermined number of times or not, for example.

In execution of the determination program 112d, when it is determined that the phase difference of the drive electricity and the back EMF which is detected by the back EMF detection device 11 is within the predetermined range by the execution of the determination program 112b, the CPU 121 counts the number of times the phase difference is determined as being within the predetermined range and determines whether the number of times the phase difference is determined as being within the predetermined range is more or equal to a predetermined number of times (for example, 5 times).

The CPU 121 functions as the determination unit by executing the above determination program 112d.

The light source control program 112e is a program to make the CPU 121 realize a function to start lighting of the laser light sources 2 when it is determined that the number of times the phase difference is determined as being within the predetermined range by the determination unit is more or equal to the predetermined number of times, for example.

When the CPU 121 determines that the number of times the phase difference between the drive electricity and the back EMF is within the predetermined range is more or equal to the predetermined number of times by the execution of the above described determination program 112d, the CPU 121 executes the light source control program 112e to light the laser light sources 2 by the light source drive unit 9 and starts emission of the laser beams.

The CPU 121 functions as the light source control unit along with the light source drive unit 9 by executing the above light source control program 112e.

According to the laser projector 200 of the second embodiment described above, the laser beam from the laser light sources 2 is scanned by the electromagnetic driven scan mirror 4, the phase difference between the back EMF which is generated by the drive of the electromagnetic driven scan mirror 4 and the drive electricity is detected by the detection program (detection unit) 112a at the time of start-up of the laser projector 200, whether the phase difference detected by the detection program (detection unit) 112a is within the predetermined range or not is determined by the determination program (determination unit) 112b, and the lighting of the laser light sources 2 is started by the light source control program (light source control unit) 112e when it is determined that the phase difference is within the predetermined range by the determination program (determination unit) 112b.

That is, at the time of start-up, the laser light sources 2 are not lit while the deflection angle of the electromagnetic driven scan mirror 4 does not reach sufficient angle and the lighting of the laser light sources 2 is started only after it is confirmed that the deflection angle of the electromagnetic driven scan mirror 4 has reached sufficient angle. Therefore, the laser beam which is emitted from the laser light sources 2 being emitted within a narrow range by the scan mirror in which a sufficient deflection angle is not assured is prevented and the possibility of damaging a human body can be eliminated. Thus, the safely at the time of start-up can be improved surely in the laser projector 200.

Moreover, whether the electromagnetic driven scan mirror 4 is being driven in sufficient deflection angle or not is determined by whether the phase difference between the back EMF which is generated by the drive of the electromagnetic driven scan mirror 4 and the drive electricity is within the predetermined range or not. Therefore, safety at the time of start-up can be assured in a reliable and easy method.

Further, whether the number of times the phase difference is determined as being within the predetermined range by the determination program (determination unit) 112b is more or equal to the predetermined number of times or not is determined by the determination program (determination unit) 112d, and the lighting of the laser light sources 2 is started by the light source control program (light source control unit) 112e when it is determined that the number of times the phase difference is determined as being within the predetermined range is more or equal to the predetermined number of times by the determination program 112b (determination unit).

Therefore, the lighting of the laser light sources 2 will be started only after it is fully confirmed that the deflection angle of the electromagnetic driven scan mirror 4 has reached sufficient angle, and safety at the time of start-up is improved more.

Furthermore, when it is not determined that the phase difference is within the predetermined range by the determination program (determination unit) 112b during the predetermined time, the drive condition of the electromagnetic driven scan mirror 4 is changed by the changing program (changing unit) 112c.

Therefore, each electromagnetic driven scan mirror 4 can be driven at their innate resonance frequency in an easy method even when the resonance frequency is fluctuating.

Here, the scope of the present invention is not limited to the above embodiments, and various modifications and changes in design may be carried out within the scope of the present invention.

For example, the electromagnetic driven scan mirror is described by using the MEMS mirror which vibrates in two-dimensional direction as an example in the above embodiments. However, the electromagnetic driven scan mirror is not limited to this, and two galvanometer mirrors which vibrate in one-dimensional direction may be used, for example. Further, scanning in two-dimensional direction may be carried out by combining a polygon mirror and a galvanometer mirror.

Furthermore, a detection unit to detect a displacement of a rotation angle of the electromagnetic driven scan mirror or a detection unit to detect an emitting position of the laser beam on the screen S may be provided. The angle of the scan mirror can be controlled highly accurately by feeding back the detection signal from such detection units to the mirror drive unit 7.

Moreover, the absolute value of the peak of the back EMF may be made to be detected in the back EMF detection device 5, and after the drive frequency of the electromagnetic driven scan mirror is changed by the predetermined value, whether the drive frequency is positively shifted or negatively shifted with respect to the resonance frequency can be figured out by comparing the value of the back EMF detected by being driven at the drive frequency after the frequency change is carried out to the value of the back EMF detected by being driven at the drive frequency before the frequency change is carried out by a predetermined value and the difference between the drive frequency and the resonance frequency can be calculated and the drive frequency can be changed only for the calculated difference. In such way, the start-process of lighting of the laser light sources can be carried out efficiently in shorter time.

According to a first aspect of the preferred embodiments of the present invention, there is provided a laser projector to display an image by projecting a laser beam from a laser light source to a projection screen comprising an electromagnetic driven scan mirror to scan the laser beam from the laser light source, a detection unit to detect a back EMF which is generated by a drive of the electromagnetic driven scan mirror at a time of start-up of the laser projector, a first determination unit to determine whether a value of the back EMF which is detected by the detection unit exceeded a predetermined threshold or not and a light source control unit to start a lighting of the laser light source when the value of the back EMF is determined as exceeding the predetermined threshold by the determination unit.

Preferably, the laser projector further comprises a second determination unit to determine whether a number of times the value of the back EMF is determined as exceeding the predetermined threshold by the first determination device is more or equal to a predetermined number of times or not, and the light source control unit starts the lighting of the laser light source when the number of times the value of the back EMF is determined as exceeding the predetermined threshold by the first determination unit is determined so as to exceed the predetermined number of times.

Preferably, the laser projector further comprises a changing unit to change a drive condition of the electromagnetic driven scan mirror or the predetermined threshold when the value of the back EMF is not determined as exceeding the predetermined threshold by the first determination unit during a predetermined time.

According to a second aspect of the preferred embodiments of the present invention, there is provided a laser projector to display an image by projecting a laser beam from a laser light source to a projection screen comprising an electromagnetic driven scan mirror to scan the laser beam from the laser light source a detection unit to detect a phase difference between a back EMF which is generated by a drive of the electromagnetic driven scan mirror and a drive electricity at a time of start-up of the laser projector, a first determination unit to determine whether the phase difference detected by the detection unit is within a predetermined range or not and a light source control unit to start a lighting of the laser light source when the phase difference is determined as being within the predetermined range by the first determination unit.

Preferably, the laser projector further comprises a second determination unit to determine whether a number of times the phase difference is determined as being within the predetermined range by the first determination unit is more or equal to a predetermined number of times or not, and the light source control unit starts the lighting of the laser light source when the number of times the phase difference is determined as being within the predetermined range by the first determination unit is determined so as to be more or equal to the predetermined number of times by the second determination unit.

Preferably, the laser projector further comprises a changing unit to change a drive condition of the electromagnetic driven scan mirror when the phase difference is not determined as being within the predetermined range by the first determination unit during a predetermined time.

According to a third aspect of the preferred embodiments of the present invention, there is provided a laser projector to display an image by projecting a laser beam from a laser light source to a projection screen comprising an electromagnetic driven scan mirror to scan the laser beam from the laser light source, a detection unit to detect a back EMF which is generated by a drive of the electromagnetic driven scan mirror at a time of start-up of the laser projector, a first determination unit to determine whether a value of the back EMF which is detected by the detection unit exceeded a predetermined threshold or not, a changing unit to change a drive condition of the electromagnetic driven scan mirror or the predetermined threshold when the value of the back EMF is not determined as exceeding the predetermined threshold by the first determination unit during a predetermined time, a second determination unit to determine whether a number of times the value of the back EMF is determined as exceeding the predetermined threshold by the first determination unit is more or equal to a predetermined number of times or not and a light source control unit to start a lighting of the laser light source when the number of times the value of the back EMF is determined as exceeding the predetermined threshold by the first determination unit is determined so as to be more or equal to the predetermined number of times.

According to a fourth aspect of the preferred embodiments of the present invention, there is provided a laser projector to display an image by projecting a laser beam from a laser light source to a projection screen, comprising an electromagnetic driven scan mirror to scan the laser beam from the laser light source, a detection unit to detect a phase difference between a back EMF which is generated by a drive of the electromagnetic driven scan mirror and a drive electricity at a time of start-up of the laser projector, a first determination unit to determine whether the phase difference detected by the detection unit is within a predetermined range or not, a changing unit to change a drive condition of the electromagnetic driven scan mirror when the phase difference is not determined as being within the predetermined range by the first determination unit during a predetermined time, a second determination unit to determine whether a number of times the phase difference is determined as being within the predetermine range by the first determination unit is more or equal to a predetermined number of times or not and a light source control unit to start a lighting of the laser light source when the number of times the phase difference is determined as being within the predetermined range by the first determination unit is determined so as to be more or equal to the predetermined number of times.

According to the present invention, laser beam from the laser light sources is scanned by the electromagnetic driven scan mirror, the back EMF which is generated by the drive of the electromagnetic driven scan mirror is detected by the detection unit at the time of start-up of the laser projector, whether the value of the back EMF which is detected by the detection unit exceeded the predetermined threshold or not is determined by the determination unit, and lighting of the laser light sources is started by the light source control unit when it is determined by the determination unit that the value of the back EMF exceeded the predetermined threshold.

That is, at the time of start-up, the laser light sources are not lit when the deflection angle of the electromagnetic driven scan mirror has not reached a sufficient angle, and lighting of the laser light sources is started only after the deflection angle of the electromagnetic driven scan mirror has reached a sufficient angle. Therefore, laser emitted from the laser light sources will not be emitted within a narrow range by the scan mirror in which the deflection angle is not sufficiently assured, and possibility of damaging a human body can be eliminated. Thus, safety at the time of start-up can be improved reliably in the laser projector.

Moreover, whether the electromagnetic driven scan mirror is being driven in a sufficient deflection angle or not is determined by whether the value of the back EMF which is generated by the drive of the electromagnetic driven scan mirror exceeded the predetermined threshold or not. Therefore, safety at the time of start-up can be assured in a reliable and easy method.

The entire disclosure of Japanese Patent Application No. 2008-106333 filed on Apr. 16, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A laser projector to display an image by projecting a laser beam from a laser light source to a projection screen, comprising:
   an electromagnetic driven scan mirror to scan the laser beam from the laser light source;
   a detection unit to detect a back EMF which is generated by a drive of the electromagnetic driven scan mirror at a time of start-up of the laser projector;
   a first determination unit to determine whether a value of the back EMF which is detected by the detection unit exceeded a predetermined threshold or not; and
   a light source control unit to start a lighting of the laser light source when the value of the back EMF is determined as exceeding the predetermined threshold by the determination unit.

2. The laser projector as claimed in claim 1, further comprising a second determination unit to determine whether a number of times the value of the back EMF is determined as exceeding the predetermined threshold by the first determination device is more or equal to a predetermined number of times or not, wherein
   the light source control unit starts the lighting of the laser light source when the number of times the value of the back EMF is determined as exceeding the predetermined threshold by the first determination unit is determined so as to exceed the predetermined number of times.

3. The laser projector as claimed in claim 1, further comprising a changing unit to change a drive condition of the electromagnetic driven scan mirror or the predetermined threshold when the value of the back EMF is not determined as exceeding the predetermined threshold by the first determination unit during a predetermined time.

4. A laser projector to display an image by projecting a laser beam from a laser light source to a projection screen, comprising:
   an electromagnetic driven scan mirror to scan the laser beam from the laser light source;
   a detection unit to detect a phase difference between a back EMF which is generated by a drive of the electromagnetic driven scan mirror and a drive electricity at a time of start-up of the laser projector;
   a first determination unit to determine whether the phase difference detected by the detection unit is within a predetermined range or not; and
   a light source control unit to start a lighting of the laser light source when the phase difference is determined as being within the predetermined range by the first determination unit.

5. The laser projector as claimed in claim 4, further comprising a second determination unit to determine whether a number of times the phase difference is determined as being within the predetermined range by the first determination unit is more or equal to a predetermined number of times or not, wherein
   the light source control unit starts the lighting of the laser light source when the number of times the phase difference is determined as being within the predetermined range by the first determination unit is determined so as to be more or equal to the predetermined number of times by the second determination unit.

6. The laser projector as claimed in claim 4, further comprising a changing unit to change a drive condition of the electromagnetic driven scan mirror when the phase difference is not determined as being within the predetermined range by the first determination unit during a predetermined time.

7. A laser projector to display an image by projecting a laser beam from a laser light source to a projection screen, comprising:
   an electromagnetic driven scan mirror to scan the laser beam from the laser light source;
   a detection unit to detect a back EMF which is generated by a drive of the electromagnetic driven scan mirror at a time of start-up of the laser projector;
   a first determination unit to determine whether a value of the back EMF which is detected by the detection unit exceeded a predetermined threshold or not;
   a changing unit to change a drive condition of the electromagnetic driven scan mirror or the predetermined threshold when the value of the back EMF is not determined as exceeding the predetermined threshold by the first determination unit during a predetermined time;
   a second determination unit to determine whether a number of times the value of the back EMF is determined as exceeding the predetermined threshold by the first determination unit is more or equal to a predetermined number of times or not; and
   a light source control unit to start a lighting of the laser light source when the number of times the value of the back EMF is determined as exceeding the predetermined threshold by the first determination unit is determined so as to be more or equal to the predetermined number of times.

8. A laser projector to display an image by projecting a laser beam from a laser light source to a projection screen, comprising:
   an electromagnetic driven scan mirror to scan the laser beam from the laser light source;
   a detection unit to detect a phase difference between a back EMF which is generated by a drive of the electromagnetic driven scan mirror and a drive electricity at a time of start-up of the laser projector;
   a first determination unit to determine whether the phase difference detected by the detection unit is within a predetermined range or not;
   a changing unit to change a drive condition of the electromagnetic driven scan mirror when the phase difference is not determined as being within the predetermined range by the first determination unit during a predetermined time;
   a second determination unit to determine whether a number of times the phase difference is determined as being within the predetermine range by the first determination unit is more or equal to a predetermined number of times or not; and
   a light source control unit to start a lighting of the laser light source when the number of times the phase difference is determined as being within the predetermined range by the first determination unit is determined so as to be more or equal to the predetermined number of times.

9. The laser projector as claimed in claim 2, further comprising a changing unit to change a drive condition of the electromagnetic driven scan mirror or the predetermined threshold when the value of the back EMF is not determined as exceeding the predetermined threshold by the first determination unit during a predetermined time.

10. The laser projector as claimed in claim 5, further comprising a changing unit to change a drive condition of the electromagnetic driven scan mirror when the phase difference is not determined as being within the predetermined range by the first determination unit during a predetermined time.

* * * * *